United States Patent [19]
Baumann et al.

[11] 3,899,514
[45] Aug. 12, 1975

[54] NOVEL SPIRODIPYRANS AND CHROMOGENIC MATERIALS FOR COPYING PROCESSES

[75] Inventors: Hans Baumann, Ludwigshafen; Andreas Oberlinner, Mannheim, both of Germany

[73] Assignee: Badische Anilin- & Soda-Fabrik Aktiengesellschaft, Ludwigshafen (Rhine), Germany

[22] Filed: June 28, 1973

[21] Appl. No.: 374,353

[30] Foreign Application Priority Data
July 1, 1972  Germany.............................. 2232364

[52] U.S. Cl...................................... 260/345.2; 8/7
[51] Int. Cl............................................... C07d 7/26
[58] Field of Search................................. 260/345.2

[56] References Cited
UNITED STATES PATENTS
3,022,318   2/1962   Berman et al. .................. 260/345.2

*Primary Examiner*—John M. Ford
*Attorney, Agent, or Firm*—Johnston, Keil, Thompson & Shurtleff

[57] ABSTRACT

Spirodipyrans based on 2-alkylarylpyrylium salts and 4-dialkylaminobenzaldehydes, their manufacture and their use as dye precursors for pressure-sensitive recording materials.

4 Claims, No Drawings

NOVEL SPIRODIPYRANS AND CHROMOGENIC MATERIALS FOR COPYING PROCESSES

This invention relates to spirodipyrans of formula I:

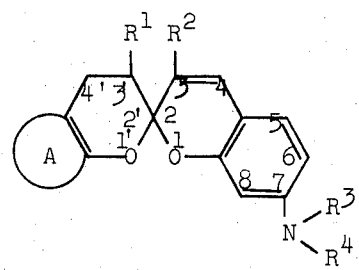

in which
- A denotes a benzene or naphthalene nucleus optionally substituted by chlorine, bromine, or alkoxy or carbalkoxy radicals,
- $R^1$ denotes alkyl of from 1 to 8 carbon atoms,
- $R^2$ denotes hydrogen or alkyl or aryl of from 1 to 8 carbon atoms, or $R^1$ and $R^2$ together form a ring, and
- $R^3$ and $R^4$ denote $C_{1-6}$ alkyl optionally substituted by cyano.

The spirodipyrans of formula I are colorless or slightly colored compounds. When dissolved in nonpolar or slightly polar solvents such as hydrocarbons, chlorohydrocarbons or esters, they give intensely blue colorations when acidic substances are added. This reaction, which may also be effected by kaolin, zeolites, bentonite, silicic acid and phenolic condensation products, makes the compounds suitable for use as dye precursors in pressure-sensitive recording materials, in particular for the manufacture of copying papers.

Examples of suitable starting materials are as follows: pyrylium salts of formula II in the form of their chlorides, perchlorates, tetrafluoborates or tetrachloroferrates;
2,3-dimethylbenzopyrylium salt,
2,3-dimethyl-6-chlorobenzopyrylium salt, Particular examples of the alkoxy and carbalkoxy radicals with which the aromatic nucleus A may be substituted are carbomethoxy, carboethoxy, methoxy and ethoxy in the position 6' when A is a benzene nucleus and in position 10' when A is a naphthalene nucleus. Preferred sites of substitution of the nucleus are position 6' in the case of benzene and position 10' in the case of naphthalene, the naphthalene nucleus itself being preferably in the position 2,1-b on the pyrylium nucleus.

Particularly preferred values of $R^1$ are methyl and isopropyl.

Preferred values of $R^2$ are methyl, ethyl, propyl, t-butyl, phenyl and also a trimethylene bridging group connecting the positions 3 and 3' of the two pyrylium nuclei, and hydrogen.

Preferred values of $R^3$ and $R^4$ are methyl, ethyl, propyl and β-cyanoethyl, $R^3$ being preferably the same as $R^4$.

Of particular commercial importance are the compounds of the formulae:

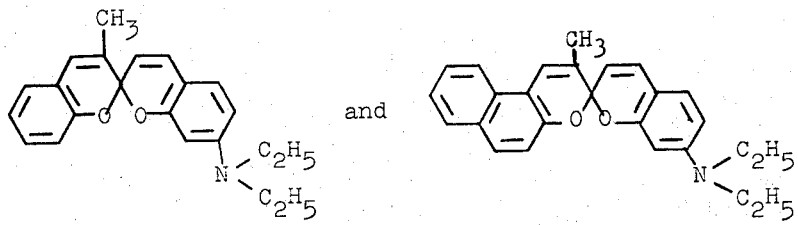

The spirodipyrans of formula I may be manufactured by condensation of 2-alkylbenzo- or 2-alkylnaphthopyrylium salts of formula II with 4-dialkylamino-2-hydroxybenzaldehydes of formula III followed by cyclization of the resulting pyrylium salts of formula IV with bases in known manner according to the following scheme:

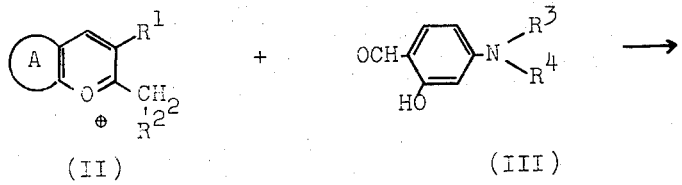

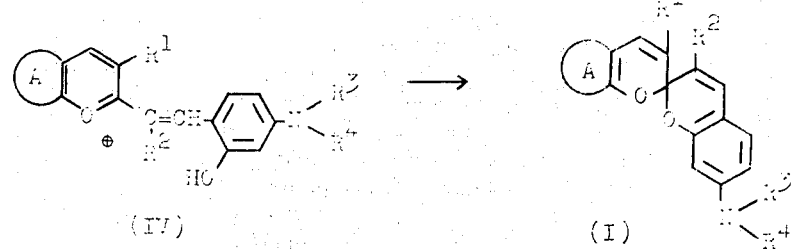

2,3-dimethylnaphtho[2,1-b]pyrylium salt,
2-methyl-3-isopropylnaphtho[2,1-b]pyrylium salt,
2-ethyl-3-methylnaphtho[2,1-b]pyrylium salt,
2,3-dimethyl-10-carbomethoxynaphtho[2,1-b]pyrylium salt and
2,3-tetramethylenenaphtho[2,1-b]pyrylium salt.

In place of the pyrylium salts the corresponding β-(2-hydroxyaryl-1)-vinylketones may be advantageously used.

Aldehydes of formula III:
4-dimethylamino-2-hydroxybenzaldehyde,
4-diethylamino-2-hydroxybenzaldehyde and
4-(N-methyl-N-β-cyanoethylamino)-2-hydroxybenzaldehyde.

The condensation is conveniently carried out in organic solvents such as alcohols, carboxylic acids, carboxylic anhydrides, carboxamides, hydrocarbons and acetonitrile and in the presence or absence of acidic or basic condensating agents such as zinc chloride, phosphoric acid, toluenesulfonic acid, boric acid, pyridine, piperidine, triethylamine and ammonium acetate in the amounts and under the conditions normally used in condensation reactions of this kind. The ring closure to the pyran may take place either at the same time as or subsequently to the condensation in the same or a separate stage, optionally in the presence of bases such as alkalis, sodium carbonate, sodium acetate, ammonia, aliphatic amines and pyridine, in known manner. The spirodipyran compounds which precipitate from the solution in the form of crystals may then be used in known manner as dye precursors in copying processes.

For example, they may be worked into a paste which is then coated onto paper and overcoated with a protective layer. A particularly advantageous process consists in dissolving the dye precursors in a non-volatile or only slightly volatile solvent such as chloroparaffin or trichlorodiphenyl, or in a normal solvent such as toluene, and enclosing the solution in microcapsules and coating the surface of paper with said microcapsules. When pressed against an acid reacting layer by a writing operation, these precursors produce blue characters.

When compared with the spirodibenzopyrans and spirodinaphthopyrans disclosed in German Pat. No. 1,127,920 and Belgian Pat. No. 589,726, the compounds of the invention are distinguished by their very high color strength and by the excellent photocopies which can be made of the characters produced with said compounds.

In the following Examples the parts and percentages are by weight.

EXAMPLE 1

35.7 parts of 2,3-dimethylbenzopyrylium tetrachloroferrate and 19.3 parts of diethylaminosalicylaldehyde are heated under reflux in 200 parts of ethanol for 2 hours. On completion of the condensation, the dye is isolated, dissolved in 200 parts of acetone and mixed with 80 parts of 25% ammonia solution and 250 parts of water. The reaction mixture is extracted with 700 parts of benzene. The benzene phase is separated, purified with animal charcoal, dried over sodium sulfate and concentrated to a volume of approx. 200 parts. The addition of light petroleum causes the precipitation from this solution of 25 parts of 3'-methyl-7-diethylamino-2,2'-spirodi-[2H-1-benzopyran] in the form of colorless crystals, m.p. 109°–110°C.

If a solution of this compound in dodecylbenzene is enclosed in microcapsules, which are then coated onto the surface of paper, a blue coloration is obtained when the microcapsules are ruptured by a writing operation causing the contents of the capsules to contact an acid reacting layer.

EXAMPLE 2

81.4 parts of 2,3-dimethylnaphthopyrylium tetrachloroferrate and 36.6 parts of diethylaminosalicylaldehyde are heated under reflux in 200 parts of ethanol for 1 hour. After the elimination of acid from the dye using ammonia as described in Example 1, there are obtained 52 parts of the colorless compound 3'-methyl-7-diethylaminospiro-(2H-1-benzopyran-2,2'-[2H]-naphto[2,1-b]pyran), m.p. 181°–182°C.

If a solution of this compound in toluene or diisopropylbenzene is applied to an acid reacting layer, an intense blue coloration is produced instantaneously.

EXAMPLE 3

15 parts of 2,3-dimethyl-10-carbomethoxynaphthopyrylium tetrachloroferrate and 6.3 parts of diethylaminosalicylaldehyde are heated under reflux in 100 parts of ethanol for 5 hours.

The reaction mixture is worked up as in Example 1 to give 3'-methyl-10'-carbomethoxy-7-diethylaminospiro(2H-1-benzopyran-2,2'-[2H]-naphtho 2,1-b pyran), m.p. 168°–170°C.

Papers coated with this compound in microcapsules give a blue coloration when pressed against an acid reacting layer by a writing operation.

EXAMPLE 4

20 parts of 2-methyl-3-isopropylbenzopyrylium tetrachloroferrate and 14.5 parts of diethylaminosalicylaldehyde are heated under reflux in 150 parts of ethanol for 40 minutes. The dye thus formed is converted, as in Example 1, to the colorless compound 3'-isopropyl-7-diethylamino-2,2'-spirodi[2H-1-benzopyran], m.p. 96°–98°C.

This compound gives a blue coloration when contacted with an acid reacting substance. The dye precursor is eminently suitable for the manufacture of copying papers on account of its high tinctorial strength.

EXAMPLE 5

21 parts of 2-methyl-3-isopropylnaphthopyrylium tetrachloroferrate and 9.7 parts of diethylaminosalicylaldehyde are heated under reflux in 150 parts of ethanol for 45 minutes. The isolated dye is then converted, by treatment with ammonia as in Example 1, to the colorless compound 3'-isopropyl-7-diethylaminospiro(2H-1-benzopyran-2,2'-[2H]-naphtho[2,1-b]pyran), m.p. 139°–140°C, in a yield of 10 parts. This compound gives a blue coloration when contacted with acid reacting substances. It is eminently suitable for the manufacture of copying papers on account of its high tinctorial strength.

EXAMPLE 6

16.7 parts of 2,3-tetramethylene-naphthopyrylium perchlorate and 9.6 parts of diethylaminosalicylaldehyde are heated under reflux in 100 parts of ethanol for 25 minutes. The dye is isolated and stirred in 30 parts of 25% ammonia solution and 300 parts of benzene until the color disappears completely. The benzene phase is separated, purified with animal charcoal, dried over sodium sulfate and concentrated. There are obtained 8 parts of the colorless compound 3,3'-trimethylene-7-diethylaminospiro(2-H-1-benzopyrane-2,2'-[2H]-naphtho[2.1-b]pyran), m.p. 154°–157°C.

A solution of this compound in chlorinated diphenyl in microcapsules gives a blue coloration as in Example 1.

EXAMPLE 7

Example 6 is repeated except that in place of 2,3-tetramethylenenaphthopyrylium perchlorate 2,3-tetramethylene-10-carbomethoxynaphthopyrylium perchlorate is reacted with diethylaminosalicylaldehyde. There is obtained a compound which gives bluish violet colorations when contacted with acids.

EXAMPLE 8

35.7 parts of 2,3-dimethylbenzopyrylium tetrachloroferrate and 16.5 parts of dimethylaminosalicylaldehyde are heated under reflux in 100 parts of alcohol for 2 hours.

The dye thus formed is converted, as described in Example 1, to the colorless compound 3'-methyl-7-dimethylamino-2,2'-spirodi[2 H-1-benzopyran], m.p. 147°–148°C.

This compound gives a blue coloration when contacted with acid reacting substances.

EXAMPLE 9

40.7 parts of 2,3-dimethylnaphthopyrylium tetrachloroferrate and 16.5 parts of dimethylaminosalicylaldehyde are heated under reflux in 100 parts of alcohol for 2 hours.

The dye is treated with ammonia as described in Example 1 to give 23 parts of the colorless compound 3'-methyl-7-dimethylaminospiro(2 H-1-benzopyran-2,2'-[2H]-naphtho[2.1-b]pyran), m.p. 198°–200°C.

This compound gives a blue coloration when contacted with acid reacting substances.

We claim:
1. A spirodipyran of the formula:

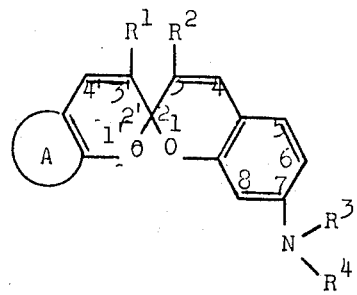

in which,
A is a benzene or naphthalene nucleus optionally substituted by one chlorine atom, one bromine atom, or one carbomethoxy or one carbethoxy group,
$R^1$ is methyl or isopropyl,
$R^2$ is hydrogen, or $R^1$ and $R^2$ together form a trimethylene radical, and
$R^3$ and $R^4$ are methyl, ethyl or propyl.

2. A spirodipyran as set forth in claim 1, wherein $R^3$ and $R^4$ are ethyl or methyl.

3. The spirodipyran of the formula:

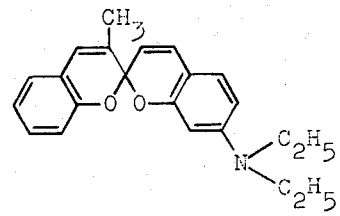

4. The spirodipyran of the formula:

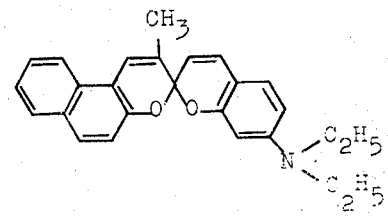

* * * * *

UNITED STATES PATENT AND TRADEMARK OFFICE
CERTIFICATE OF CORRECTION

PATENT NO. : 3,899,514
DATED : August 12, 1975
INVENTOR(S) : Hans Baumann et al.

It is certified that error appears in the above-identified patent and that said Letters Patent are hereby corrected as shown below:

At the bottom of Column 2, after Formula I, insert -- Examples of suitable starting materials are as follows: pyrlium salts of formula II in the form of their chlorides, perchlorates, tetrafluoborates or tetrachloroferrates; 2,3-dimethylbenzopyrylium salt, 2,3-dimethyl-6-chlorobenzopyrylium salt, --

Signed and Sealed this

Third Day of August 1976

[SEAL]

Attest:

RUTH C. MASON
Attesting Officer

C. MARSHALL DANN
Commissioner of Patents and Trademarks